United States Patent [19]

Hehl

[11] 4,042,075

[45] Aug. 16, 1977

[54] MOUNTING AND BRAKE ASSEMBLY FOR ROLLER BLIND

[75] Inventor: Klaus Hehl, Remscheid-Luttringhausen, Germany

[73] Assignee: Riloga-Werk Julius Schmidt, Remscheid-Luttringhausen, Germany

[21] Appl. No.: 705,384

[22] Filed: July 15, 1976

[30] Foreign Application Priority Data

July 17, 1975 Germany ............................ 2531864

[51] Int. Cl.[2] ............................................ F16D 49/00

[52] U.S. Cl. ...................................... 188/75; 160/298; 188/80; 188/83; 188/262

[58] Field of Search ..................... 188/75, 80, 83, 262; 160/291, 298, 319

[56] References Cited

U.S. PATENT DOCUMENTS

| | | | |
|---|---|---|---|
| 193,239 | 7/1877 | Fontayne | 160/298 X |
| 1,090,546 | 3/1914 | Kudla | 160/298 |
| 1,591,371 | 7/1926 | Franz | 160/298 |
| 1,746,936 | 2/1930 | Hadden | 160/298 |
| 1,834,230 | 12/1931 | Unke | 188/80 |
| 2,708,967 | 5/1955 | Suson | 160/298 |

FOREIGN PATENT DOCUMENTS

| | | | |
|---|---|---|---|
| 664,547 | 4/1929 | France | 188/80 |
| 237,761 | 8/1925 | United Kingdom | 188/80 |
| 10,917 | 8/1884 | United Kingdom | 188/262 |

*Primary Examiner*—George E. A. Halvosa
*Attorney, Agent, or Firm*—Michael J. Striker

[57] ABSTRACT

A mounting assembly for a roller blind comprises a housing in which is rotatable a drive wheel by a flexible member such as a chain. A roller blind is connected to a shaft which carries this drive wheel and is, therefore, rotatable with the drive wheel for raising and lowering of the roller blind. A friction-type brake wheel is jointly rotatable with the drive wheel in the housing and has an outer periphery against which radially engage rollers carried on a pair of pincher-type levers whose one ends are pivoted together and whose other ends are interconnected by a screw device so that the force which the rollers exert radially on the friction wheel can be controlled. This force determines the braking effect between the shaft and the housing so that the blind carried by this mounting assembly remains stationary in any set position.

10 Claims, 7 Drawing Figures

MOUNTING AND BRAKE ASSEMBLY FOR ROLLER BLIND

BACKGROUND OF THE INVENTION

The present invention relates to a mounting assembly for a roller blind and the like. More particularly this invention concerns such an assembly which allows the roller blind carried thereby to be arrested in any of a multiplicity of positions.

Roller blinds are frequently mounted at the top of the window or at the edge of the aperture across which the blind moves. Such a device typically includes some kind of frame or housing, a shaft rotatable relative to this housing, and means interconnecting the shaft and the housing in order to allow the blind to be arrested at any of a multiplicity of positions.

In the most common of such arrangements a spring is provided in the rod or shaft carrying the roller blind and means is provided which includes a centrifugally outwardly swingable pawl that is urged radially inwardly by means of a very weak spring. This pawl is carried on the shaft so that it is rotated as the blind is raised and lowered, and there is provided a non-rotatable toothed wheel fixed relative to the shaft with which the pawl can engage in order to arrest rotation of the shaft relative to the housing. The pawl, spring, and teeth of the wheel in the rod are so arranged that the rod can always move in a direction corresponding to unwinding of the blind from this rod, but the pawl can block movement in the opposite direction. With such an arrangement, therefore, the pawl does not engage the teeth so long as the rod is rotating relatively rapidly relative to the housing, as centrifugal force holds the pawl out of engagement with the teeth. When the rod is rotated relatively slowly, however, the pawl can engage. Thus to raise the blinds the user must first jerk it sharply downwardly and then move it rapidly upwardly in order to maintain sufficient rotational speed to hold the pawl back.

Such an arrangement often has a relatively limited service life. In particular when used with relatively heavy slat-type roller blinds or the like such an arrangement frequently wears out in a very short time. In addition it is impossible with such devices to have a stepless positioning of the blind, as the blind rod can only be arrested in a position corresponding to interfitting of the pawl with one of the teeth on its non-rotatable wheel.

SUMMARY OF THE INVENTION

It is therefore an object of the present invention to provide an improved mounting assembly for a roller blind and the like.

Another object is the provision of such an assembly which has a long service life and which can be used for relatively heavy loads such as slat-type roller blinds.

Yet another object is to provide such a device which can be adjusted to compensate for wear and which allows stepless positioning of the blind carried by it in any position.

These objects are attained according to the present invention in a mounting assembly for a roller blind comprising a housing, a shaft rotatable about an axis in the housing and adapted to carry the roller blind or the like, and brake means including a first element operatively connected to the shaft and a second element bearing on the first element and operatively connected to the housing. One of the elements rolls on the other of the elements for creating rolling friction therebetween that serves to brake rotation of the shaft relative to the housing.

In accordance with this invention one of these elements is a roller and the other is a body having a periphery centered on the axis and engaged continuously by the roller. It is possible to provide the brake wheel having the periphery on the housing and the roller on the shaft carrying the blind. According to another feature of this invention, however, a brake wheel of friction-type material is operatively connected to and rotatable jointly with the shaft. This wheel has an outer periphery that is continuously engaged by a wheel carried intermediate the ends of a lever. The lever is pivoted at its one end and is pulled or pushed at its other end so that the roller bears continuously radially on the outer periphery of the friction wheel.

According to yet another feature of this invention a pair of such arms is provided. These arms are pivoted together at their one ends and each carry intermediate their ends one such roller. Between the other ends of the levers there is provided urging means which pulls them together so as to clamp the rollers, pincher-fashion, against the outer periphery of the friction disc. A third roller is provided at the pivot axis between the one ends of these levers so that the system is self-centering. The levers are formed to this end as forks in their intermediate portions for carrying the rollers. These rollers are angularly equispaced about the axis.

In accordance with yet another feature of this invention the means for urging includes a screw threadedly engaged with the other end of one of the levers and having a shoulder bearing on the other end of the other lever. Thus rotating this screw in one direction will move the other ends of these levers toward each other and opposite turning will move them apart. Moving them toward each other will increase the braking effect and vice versa.

The mounting assembly comprises according to further features of this invention a drive wheel jointly rotatable with the brake wheel and formed with a peripheral groove in which may engage a ball-type chain serving to operate the blind. It is also possible to use a simple sprocket arrangement using a bicycle-type chain.

The assembly may have in accordance with this invention two levers pivoted about an axis parallel to the first-mentioned rotation axis for the shaft but spaced therefrom. These levers carry at their intermediate regions secondary rocking levers each carrying at each of its ends a roller. Thus moving of the primary levers toward each other will force the four rollers against the friction disc. Such an arrangement, once again, has the considerable advantage that the braking rollers serve the secondary function of rotatably supporting the mounting shaft for the roller blind in the housing.

According to yet another feature of this invention the brake wheel comprises a hub having an outer periphery formed with teeth, and an annular brake pad engaged over this hub at these teeth so as to be rotationally locked to this hub. Such an arrangement makes it relatively easy to remove and replace the brake pad if same becomes worn out. The hub is of hollow cylindrical shape centered on the axis and is formed at its center with a polygonal socket that receives polygonal-section shaft on which the roller blind is mounted.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
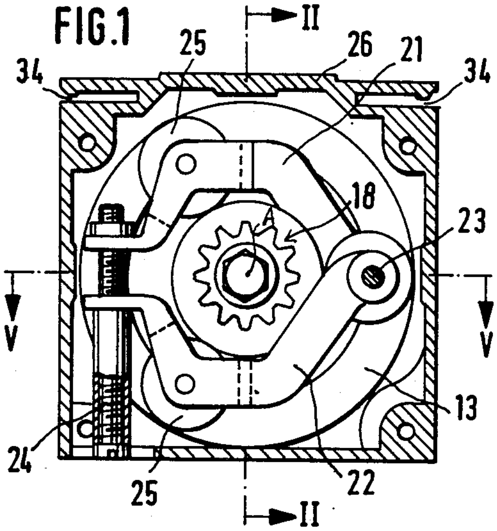
FIG. 1 is a cross-section through a mounting assembly in accordance with this invention.
Figure 2:
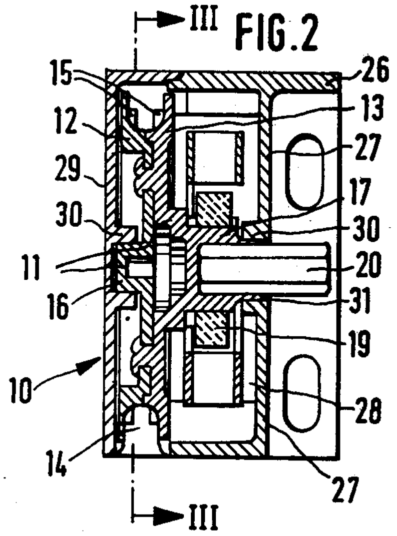
FIG. 2 is a section taken along line II—II of FIG. 1.
Figure 3:
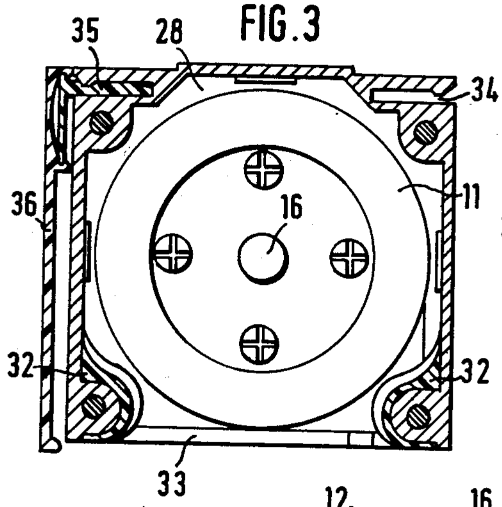
FIG. 3 is a section taken along line III—III of FIG. 2.
Figure 4:
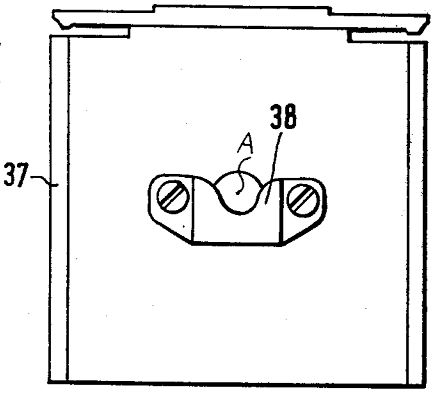
FIG. 4 is an axial end view of the unit used to mount the other end of the roller blind in accordance with this invention.

As shown in FIGS. 1, 2, 3 and 5 the mounting assembly according to this invention has a housing 10 in which a chain-drive wheel 11 is rotatable about an axis A. This wheel 11 is rotatable by means of a ball-type endless chain. The wheel 11 has a pair of flanges 12 and 13 defining a radially outwardly open groove 14 in which teeth 15 are provided in order to engage between the balls of the chain and allow the chain rotationally to entrain the wheel 11 for rotation about the axis A. The wheel 11 has on one axial side a short stub shaft 16 received in a journal 30 formed in a sidewall 29 of the housing 10.

On its other side the drive wheel 11 is formed with a hub 17 formed externally with teeth that engage in corresponding internal teeth on the inside of a fiber-type annular brake pad 19 that together with the hub 17 constitutes a brake wheel 18. The hub 17 is generally cylindrically hollow and centered on the axis A. It forms a hexagonal socket in which is received a short shaft 20 of similar hexagonal cross-section. One end of a roller blind that is to be wound and unwound by rotation of its central rod about the axis A is received over this rod or shaft 20. The other end of the roller blind rod is received in a holder 38 in a unit 37 of similar shape to the housing 10 and adapted to be mounted at the opposite end of the edge of the opening to be covered by the blind.

Figure 5:
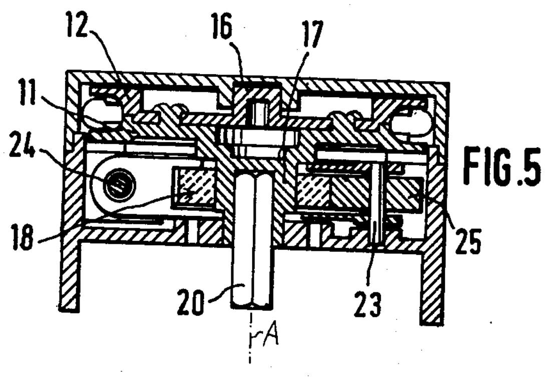
FIG. 5 is a section taken along line V—V of FIG. 1.

A pair of levers 21 and 22 have their one ends pivoted together on a rod 23 received as shown in FIG. 5 in the wall 27 of the housing so that this pivot axle 23 is fixed relative to the axis A. The levers 21 and 22 are formed intermediate their ends as forks in which are journalled rollers 25 that bear radially inwardly against the periphery of the brake wheel 18. In addition another such roller 25 is provided on the axle pin 23. The rollers 25 are angularly equispaced 120° apart about the axis A in order to insure that the braking arrangement is self-centering. The other ends of the levers 21 and 22 are interconnected by a biasing or adjustment means 24 which comprises a screw threaded in a nut carried on the other end of the one arm 21 and having a head bearing on a sleeve carried on the other end of the other lever 22. The screw is accessible through a hole from outside the housing 10 so that when it is screwed in it will pull the levers 21 and 22 toward each other and, therefore, increase the force with which the rollers 25 bear on the wheel 18 and vice versa.

The one wall 27 of the housing 10 is formed with a journal 30 for the hub 17. In addition this housing 10 has a top wall 26 underneath which are formed recesses 34 adapted to receive flanges 35 of a cover plate 36 that is intended to extend along the front of the assembly between the housing 10 and the unit 37 to cover the roller when it is wound all the way up. The housing has a downwardly open bottom portion 33 and to each side of this portion next to the drive wheel 11 cushions 32 in order to insure that the drive chain remains engaged between the riveted-together flanges 12 and 13 of the wheel 11. Thus the mechanism of the mounting assembly is mounted between the one wall 26 where there is provided the journal 30 for the stub shaft 16 and the other wall 27 where there is provided the journal 30 for the extension 31 of the hub 17. The space 28 between these two walls 26 and 27 therefore completely encloses the mechanism of the blind.

Figure 6:
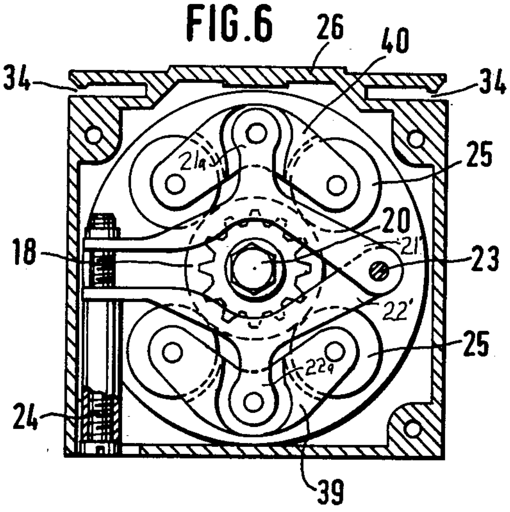
FIGS. 6 and 7 are views corresponding to FIGS. 1 and 2, respectively, showing another mounting assembly in accordance with the present invention.
Figure 7:
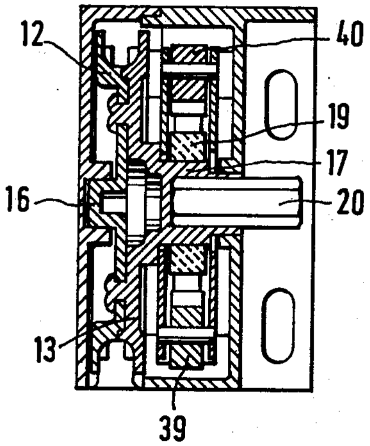

The arrangement shown in FIGS. 6 and 7 uses the same reference numerals for functionally identical structure.

Here, however, the two levers 21' and 22' pivoted together at their one ends about the fixed axle 23 and connected together at their other ends by the adjustment means 24 are provided centrally with outwardly extending arms 21*a* and 22*a*, respectively. These lugs 21*a* and 22*a* carry respective rocker arms 40 and 39 on whose ends are provided rollers 25. These rollers are symmetrical to opposite sides of a plane passing through the axis A defined by the shaft 20 and the pivot axes for the rocker arms 39 and 40 on the tabs 22*a* and 21*a*. Such an arrangement is useful for very heavy or very long roller blinds.

With the system according to the present invention it is therefore possible to adjust the arrangement so that the roller blinds only move when external force is applied to them. As soon as the chain carried on the drive wheel 11 is no longer pulled in either direction the shaft 20 will stop rotating and will hold the roller blind in the last position. The friction in the device due to rolling of the rollers 25 on the wheel 18 can be controlled very carefully by means of the adjustment mechanism 24. Since the braking force is purely related to the losses in the bearings carrying the rollers 25 and the deformation of these rollers 25 and the wheel 18, it is possible to adjust this force within very close tolerances for any type of roller blind whether of the heavy slat-type or of the simple window-shape type.

It will be understood that each of the elements described above, or two or more together, may also find a useful application in other types of assemblies differing from the types described above.

While the invention has been illustrated and described as embodied in a roller-blind mounting assembly, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A mounting assembly for a roller blind, said assembly comprising a housing; a shaft rotatable on said housing about an axis and adapted to carry a roller blind; a drive wheel fixed on said shaft and rotatable in said housing about said axis by means of a flexible member; a friction-type brake wheel in said housing fixed on said shaft and jointly rotatable with and spaced from said drive wheel about said axis and having a periphery; a pair of levers in said housing each having one end pivoted on the one end of the other lever and each also having another end; a roller carried on each of said levers intermediate its ends and directly bearing radially continuously on said periphery; and means between the other ends of said levers for pulling same toward each other and thereby pressing said rollers continuously radially against said periphery.

2. The assembly defined in claim 1, wherein said housing is provided with a shaft journal holding said shaft for rotation about said axis, said levers being provided at their one ends with a pivot pin interconnecting said levers and defining a pivot axis parallel to the shaft axis, said housing being provided with a pivot journal holding said pivot pin for rotation about said pivot axis.

3. The assembly defined in claim 2, wherein said means for pulling includes a screw threadedly engaging one of said other ends and having a shoulder bearing on the other of said other ends, whereby rotation of said screw can move said other ends toward or away from each other, said assembly further comprising another roller on said pivot pin between said levers at said one end thereof, said rollers being rotatable on said levers about respective roller axes all parallel to and angularly equispaced around said shaft axis.

4. The assembly defined in claim 1, wherein said rollers are angularly equispaced about said axis.

5. The assembly defined in claim 1, further comprising another roller continuously bearing on said wheel and carried on said one ends of said levers at the pivot axis therebetween.

6. The assembly defined in claim 1, wherein said levers are each formed as forks intermediate their ends, said rollers each being mounted at a respective one of said forks.

7. The assembly defined in claim 1, wherein said brake wheel includes an inner hub formed with external teeth and an annular brake pad fitting over said hub at said teeth and engaging said rollers.

8. The assembly defined in claim 7, wherein said hub is cylindrically hollow and centered on said axis.

9. The assembly defined in claim 1, wherein said means includes a screw threadedly engaging one of said other ends and having a shoulder bearing on the other of said other ends.

10. A mounting assembly for a roller blind, said assembly comprising a housing; a shaft in said housing lying on a shaft axis and adapted to carry a roller blind; a journal in said housing supporting said shaft for rotation about said shaft axis; a drive wheel on said shaft and rotatable in said housing about said shaft axis by means of a flexible member; a friction-type brake wheel fixed on said shaft and rotatable in said housing about said shaft axis jointly with said shaft and said drive wheel, said brake wheel having a smooth outer periphery; a pair of levers in said housing embracing said brake wheel and each extending transverse to said shaft axis, and each having a pair of lever ends; a lever pivot between one end of one of said levers and one end of the other lever for pivoting of said levers relative to each other about a pivot axis parallel to said shaft axis; a rocker on each of said levers having a pair of rocker ends and a middle between said rocker ends, said rockers each extending along the respective lever; a rocker pivot between each of said levers and the respective middle part for pivoting of said rockers on the respective levers about respective rocker axes parallel to said shaft and pivot axes; a roller on each of said rocker ends rotatable about a roller axis parallel to said shaft axis and continuously radially bearing on said outer periphery, said roller axes of each rocker flanking the respective rocker axis angularly relative to said shaft axis; and means between the other ends of said levers for pulling same toward each other and thereby pressing said rollers radially continuously against said outer periphery.

* * * * *